United States Patent [19]

Bloomfield et al.

[11] Patent Number: 6,081,623
[45] Date of Patent: *Jun. 27, 2000

[54] METHOD FOR LOSSLESS BANDWIDTH COMPRESSION OF A SERIES OF GLYPHS

[75] Inventors: Marc Alan Bloomfield, Lighthouse Point; Jeffrey Isaac Krantz, Boca Raton, both of Fla.

[73] Assignee: Citrix Systems, Inc., Ft. Lauderdale, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/540,794

[22] Filed: Oct. 11, 1995

[51] Int. Cl.[7] .................. G06K 9/36; G06K 9/46
[52] U.S. Cl. ................. 382/239; 358/430; 341/51; 341/106
[58] Field of Search ................. 382/243, 232, 382/239, 305; 358/470, 403, 404, 430; 341/51, 55, 106, 107, 67; 345/203, 509, 192, 195

[56] References Cited

U.S. PATENT DOCUMENTS

| | | | |
|---|---|---|---|
| 4,013,828 | 3/1977 | Judice | 348/422 |
| 4,410,916 | 10/1983 | Pratt et al. | 358/470 |
| 4,499,499 | 2/1985 | Brickman et al. | 358/470 |
| 4,562,423 | 12/1985 | Humblet | 340/347 DD |
| 4,701,745 | 10/1987 | Waterworth | 340/347 DD |
| 4,701,871 | 10/1987 | Sasaki et al. | 364/718 |
| 4,899,149 | 2/1990 | Kahan | 341/67 |
| 4,992,954 | 2/1991 | Takeda et al. | 341/67 |
| 5,016,009 | 5/1991 | Whiting et al. | 341/67 |
| 5,049,881 | 9/1991 | Gibson et al. | 341/95 |
| 5,051,745 | 9/1991 | Katz | 341/51 |
| 5,103,303 | 4/1992 | Shoji et al. | 358/470 |
| 5,126,739 | 6/1992 | Whiting et al. | 341/106 |
| 5,140,321 | 8/1992 | Jung | 341/55 |
| 5,155,485 | 10/1992 | Sako et al. | 341/95 |
| 5,269,003 | 12/1993 | Roskowski et al. | 395/166 |
| 5,351,129 | 9/1994 | Lai | 345/115 |
| 5,455,576 | 10/1995 | Clark, II et al. | 341/50 |
| 5,521,597 | 5/1996 | Dimitri | 341/51 |
| 5,537,551 | 7/1996 | Denenberg et al. | 341/55 |
| 5,572,206 | 11/1996 | Miller et al. | 341/51 |
| 5,771,034 | 6/1998 | Gibson | 345/192 |

OTHER PUBLICATIONS

"Patents on Data Compression Algorithms," taken from http://www–iapr–ic.dimi.uniud.it/Udine/WebRes/Image-Coding/compress/patents.html, Mar. 31, 1993, pp. 1–10.
Lafore, Turbo C++, 1990, p. 423.

Primary Examiner—Amelia Au
Assistant Examiner—Timothy M. Johnson
Attorney, Agent, or Firm—Testa, Hurwitz & Thibeault, LLP

[57] ABSTRACT

A lossless bandwidth compression method for use in a distributed processor system for communicating graphical text data from a remote application server to a user workstation over a low bandwidth transport mechanism enables the workstation display to support the illusion that the application program is running locally rather than at the remote application server. At the application server, the graphical text data is represented by a string of glyphs, each glyph being a bit mask representing the foreground/background state of the graphical text data pixels. Each unique glyph is encoded by assigning a unique identification code (IDC). Each IDC is compared with the previous IDCs in the string and, if a match is found, the IDC is transmitted to the workstation. If a match with a prior IDC is not found, the IDC and the corresponding glyph pattern are transmitted to the workstation. At the workstation, the IDCs are queued in the order received while the glyph patterns are cached using the corresponding IDCs as addresses. The string of glyphs is reconstructed by using the queued IDCs in their natural order for accessing the cached glyph patterns as required to reproduce the original string of glyphs.

14 Claims, 12 Drawing Sheets

METHOD FOR LOSSLESS BANDWIDTH COMPRESSION OF A SERIES OF GLYPHS

FIELD OF INVENTION

The invention relates to the transmission of glyphs (bit patterns representing text characters) from an application server to a client workstation in a distributed process system. A lossless bandwidth compression encoding method is applied to a string of glyphs at the application server before the encoded glyphs are transmitted to a client work-station over a common low bandwidth transport mechanism.

BACKGROUND TO THE INVENTION

Distributed process systems, in which the technique of distributing an application execution is used, are similar to the traditional multi-user systems such as Unix. From a graphics standpoint, the distributed process systems are similar to X-Windows. The technique of distributing an application execution is called Distributed Application Presentation (DAP).

In a DAP system, an application server provides application execution services to network users rather than running the application at the user's workstation. When the application runs, the application server intercepts the application user's interface (e.g., the display screen, keyboard, and mouse) data and transmits/receives this data to/from a small client (user) program running at the user's workstation. More advanced DAP systems operate in a highly integrated network environment in which an application server technology is coupled with local area network (LAN) or wide area network (WAN) transport systems as shown in FIG. 1. The host computer 300 is coupled to LAN/WAN transport system 304. This coupling, that allows the LAN/WAN network administrator to more widely distribute the services of session manager 301 and application servers 302 to user workstations 305, requires that the session manager be able to support the simultaneous execution of multiuser applications including support of workstation interfaces such as: keyboard, mouse, and display screen. The most prevalent use of application servers is in dial-in remote access DAP systems.

When running an application on an application server, the user is not actually executing the application code on the user's local workstation. Therefore, in order to make the application server's remoteness transparent, the user workstation storage disks and printers must be accessible by the application server.

The workstation includes the following capabilities:
(1) a protocol for transmission of display screen, keyboard, mouse, file, and printer data;
(2) a layered distribution architecture for transmission of the protocol packets;
(3) a client program that can run on the user workstation for protocol interpretation; and
(4) a configuration application for configuring the application distribution protocol stack for accommodating a variety of transport media and client types. When the workstation is operating as a virtual computer, it is running a client program which transmits and receives Windows-type object level protocol packets. The workstation also handles protocol packets for controlling printing and storage disk operation. If the workstation is a fixed function system, such as an ASCII text terminal, the protocol of the terminal is used.

FIG. 2 shows the major workstation protocol layers of a commercial application server system called "WinFrame™" manufactured by Citrix Systems, Inc. of Coral Springs, Fla. The WinFrame™ workstation is called "WinStation". The present invention has been implemented in a system of this type and hence the WinFrame™ system will be used as a basis for describing the invention by way of explanation only and not by way of limitation of the scope of the invention. Referring to FIG. 2, the three major sets of protocol layers are: the WinStation Driver (WD) set 10 acting as the work-station data stream manager that includes ICA, the protocol used for communication of screen, and mouse and keyboard updates, between the application server and the workstation; the protocol driver (PD) set 20 of optional communications protocol layers such as data compression, encryption, reliability (error control), and modem control; and transport drivers 21 for connecting the workstation to the connection (transport) medium.

ICA, a line protocol used to communicate Windows application presentation data with the application server over a low bandwidth connection, includes protocol definition for the following capabilities:

(1) full-screen text presentation,
(2) Windows application screen presentation,
(3) keyboard and mouse input,
(4) session control,
(5) framing of data for asynchronous connections,
(6) error detection and recovery,
(7) compression and encryption hooks,
(8) file system redirection,
(9) print redirection, and
(10) multiple generic virtual channels.

ICA uses packet communication techniques for communications between the application server and the workstation. The packet, shown in FIG. 3, can be prefixed by optional preambles, negotiated when a connection is established, for managing the transmission of the packet. The nature of the transmission medium (e.g., LAN or Async) and user defined options (e.g., compression, encryption) determine the total packet definition, but the overall packet format is as shown in FIG. 3. The labeled segments are defined as follows:

Frame Head—optional preamble protocol header for framing stream oriented transport data;

Reliable—optional preamble protocol header in packet for transmission error detection and correction;

Encrypt—optional preamble protocol header for managing encrypted data;

Compress—optional preamble protocol header for managing compressed data;

COMMAND—ICA command byte marking the beginning of the base ICA protocol packet;

COMMAND DATA—optional data bytes associated with the specified COMMAND segment that can include virtual channel protocol packets; and Frame Trail—optional protocol trailer (postamble) for framing ASYNC transport data.

Only the COMMAND byte is always present in the packet. The preambles and postamble are dependent upon the transport used and the initialization negotiations.

The ICA COMMANDS include control commands and virtual channel commands.

The ICA control COMMAND packets manage the connection of the workstation to the application server and the server relationship to workstation interface. The COMMAND packets include information on:

(1) connection initialization;
(2) workstation (client) interface and display screen control;
(3) workstation keyboard and mouse input to the application server; and
(4) workstation keyboard light emitting diode (LED) display control.

The ICA virtual channel COMMAND packets provide multiplexed management of multiple virtual channels. A virtual channel is used to add functional enhancements to the client independent of the ICA protocol. The virtual channel is a session-oriented transmission connection that can be used by the application layer code. The ICA virtual channel COMMAND protocols include: ThinWire, Printer Mapping, and Drive Mapping.

Thinwire—is used to transmit presentation commands to the client workstation from Windows applications running on the application server. It is designed to use low and width connections between the server and the workstation by using such techniques as:

(1) command and object specific compression;
(2) outboard complex clipping and complex curve drawing;
(3) efficient caching of Windows objects (bitmaps, brushes, glyphs, and pointers); and
(4) run-length encoding.

Printer Mapping—is a virtual channel protocol for the transmission of printer data to the client workstation.

Drive Mappinq—is a virtual channel protocol for the transmission of file system functions between the application server and the client workstation.

FIG. 4 shows the Citrix Systems WinStation 100 and WinFrame™ Application Server 200 Communications Stack architecture as a set of component definitions. WinStation 100 is a system component capable of displaying application data and transmitting application input data to the server. The WinStation assumes many forms such as a simple text terminal, a personal computer (PC) emulating a terminal, or a PC running a program (or terminal) that implements the ICA protocol. The functionality of the WinStations and the method of communicating with the server may differ but the architecture shown in FIG. 4 accommodates these differences.

The architecture of FIG. 4 is defined in terms of the protocol layers and their specific responsibilities. At the top of both Application server 200 and WinStation 100 are the respective data sources 210 and 110. In the case of unit 110, a display screen, keyboard, and mouse are shown and function as both a data destination and data source. As previously mentioned, the WinStation 100 may take on a variety of configurations depending on the user needs. The protocol layers are defined as follows.

WinStation Driver (WD) 10 is responsible for interpreting the data stream generated by the WinStation or Application Server. The WD is tailored to each WinStation: it is different for each type of workstation ( e.g. a dumb terminal or an ICA terminal).

Protocol Driver (PD) 20 is a communications layer added to the protocol stack for preparing the data to be transmitted to the corresponding WinStation or Application Server. Because all PDs support the same interfaces, each PD can be inserted or removed from the stack in accordance with the needs of each connection. The order in which the Pds are stacked is controlled by the configuration process.

Transport Driver (TD) is a PD for interfacing the stack to the system provided transport service 300 and is tailored to the type of transport service being used by each WinStation.

Protocol Advertiser (PA) 50 is used by each Application Server for broadcasting that a particular Application Server is on-line and functioning. In this way, a WinStation, using the same transport service, may be made aware its availability.

Protocol Listener (PL) 40 provides an Application Server with the capability to listen for connection requests from WinStations.

Name Resolver (NR) 30 is unique to the type of network to which the WinStation is connected, provides network name-to-address translation.

Name Enumerator (NE) 31 is unique to the type of network to which the WinStation is connected and provides enumeration of all on-line Application Servers on the network.

Virtual Driver (VD) 60 is for running the virtual channel protocols as defined in the ICA. The VD supports a generic set of interfaces that are accessible through system Application Protocol Interfaces (APIs) and communicates with the WD through a special interface.

The Application Server 200 of FIG. 4 includes a Win32 Subsystem 210 for the management of an associated client WinStation for which application services are to be provided. As shown in FIG. 5, subsystem 210 includes the Client Server Runtime Subsystem (CSRSS.EXE) Process 230 and Protocol Service Process 240. Process (CSRSS.EXE) 230 controls WinStation Driver Stack 220, a dynamic linkable library (DLL) of protocols by creating the control datastream needed to control the Win-Station being accessed. WinCon Server 231 contains all the console (text window) code and APIs. WD Stack 220 includes WD 10, Pds 20, and TD 21, each of which is a DLL driver.

ThinWire Driver 60 is controlled by Graphical Device Interface (GDI) Server 233 and User Server (USER) 232. GDI Server 233 is the graphics portion of the Win32 subsystem that contains all of the graphics code and APIs. USER 232 is the non-graphics portion of the Win32 subsystem that contains the remaining APIs not contained in WinCon Server 231 or GDI 233.

Protocol Service Process 240, controls PL 40 and PA 50 for effecting a connection between the Application Server and the WinStation requiring service. A PL 40 and PA 50 pair is provided for each type of transport that is supported by the system. The PA 50 broadcasts the Application Server's availability on a network while the PL 40 listens for service requests from WinStations on a network. The WD interface of 5WD Stack 220 provides WinCon Server 231 with display function information, display mode control, and session connect/disconnect information for handling full screen text transmission and WinStation initialization. Keyboard and mouse input is delivered to WinCon Server 231 through the WD interfaces. Each WD maintains a FIFO (first-in, first-out) queue for mouse and keyboard input events. A raw input thread (RIT) in process CSRSS takes its input events from this queue.

The WD Stack 220 is defined by a configuration utility named WINCFG. When a WD is defined or when the Win32 Subsystem is started, the DLLs are loaded. FIG. 6 shows the Win32 Subsystem stack components. The PD 20 and TD21 components are as previously described. The WinStation Drivers (WDs) include: ASCII terminal WD for terminals like the DEC VT420 from Digital Equipment Corp. and the Citrix ICA 3.0 WD.

ICA WinStation, a DOS (disc operating system) program for connecting to and communicating with the Application Server using the ICA protocol, is modular and can be dynamically configured and customized with different user interfaces and optional virtual channel capabilities. FIG. 7 is a graphical representation of ICA WinStation 110 that shows ICA WinStation 110 as an executable (.EXE) DOS program that includes User Interface (UI) 111 and Libraries (.LIB) 112 operating on an assortment of DLLs that are run-time loaded and linked. The Libraries can be linked with the User Interface and DLLs to provide system independent interfaces and ease in porting to non-DOS platforms.

UI 111 is the master controller of the ICA WinStation and has responsibility for:

(1) establishing and maintaining configuration data;
(2) loading required protocol components;
(3) running a polling loop; and
(4) presenting a local user interface.

In order to make a connection to a specific application server, UI 111 maintains configuration information for the connection that includes any name-to-address translation data and a list of protocol stack components (Pds and TD) and protocol parameters required. When an Application Server is selected by the user, the UI loads the appropriate stack components and passes the user selected parameters to the Application Server based upon the configuration data. Configuration Libraries (CFGs), based on Initialization (.INI) files, are used to simplify the loading and linking process. The connection process is initiated by a UI call to the ICA WD 10 at the top of the stack with a connection initiation command. The connection process is asynchronous.

UI 111 starts its polling loop by keying off the connection status that is returned. Once the connection status is established, UI gives up focus (i.e. ownership of the keyboard, mouse, and display screen) to the WD. The UI remains the master and continues to run the polling loop. WD gives up focus when the connection is broken.

While a connection exists, UI 111 can query statistics and error conditions and, can also terminate the connection. If a connection is broken, UI 111 is responsible for cleaning-up by unloading all of the stack components.

There are four .INI files associated with UI 111:

(1) MODULE.INI that lists the protocol stack components;
(2) APPSRV.INI that describes the application server configuration;
(3) MODEM.INI that describes the modem management strings; and
(4) WFCLIENT.INI that lists the user configurations.

Winstation Libraries 112, a set of run-time libraries that simplify customization of components, includes:

(1) clib, a C-language run-time library subset;
(2) cfg, libraries for configuration and standard operations such as loading and linking;
(3) ini, functions for access of .INI style parameters;
(4) video, keyboard, mouse, timer, and parallel port libraries for access to these hardware components;
(5) xms, extended memory allocation libraries; and
(6) logging, functions for standard logging and tracing facilities.

These libraries are directly linked to by the UI.EXE and are accessible to the DLLs indirectly through the DLL interface process.

ICA WD 10, when it has focus, controls the presentation of a specific WinStation protocol on the local screen display and also manages the communication of the keyboard and mouse inputs to the Application Server. Focus is given to ICA WD 10 by UI 111, as previously described.

ICA WD 10 gets its protocol packets from the topmost PD on PD stack 20. When ICA WD 10 links with this PD, it registers an input processing entry point. This entry point is called when a data packet is available. When ICA WD 10 needs to write data, it calls the PD using a PD write function.

ICA WD 10 also responds to the polling function of UI 111 and passes it on to lower stack layers. State data is reported by this method so that, for example, if a lower layer detects that a connection is broken, this status information is passed up to UI 111 through the return codes of the polling functions.

ICA WD 10 also provides a general purpose virtual channel capability represented by the set of virtual channel drivers (VDs) 60 described below.

ICA WD 10 provides a set of Application Program Interfaces (APIs) that includes:

(a) Load( ) for loading and linking a driver into the protocol stack;
(b) WdUnload( ) for unlinking and unloading a driver from the protocol stack;
(c) WdOpen for opening and initializing a driver;
(d) WdClose for closing a driver;
(e) WdInfo for querying driver information;
(f) WdPoll for getting status and giving control to drivers in the protocol stack;
(g) WdQueryInformation for querying modem status, mouse information, last error, and statistics; and
(h) WdSetInformation for connecting, disconnecting, setting or killing a focus.

All protocol drivers (Pds) 20 have the same interfaces and are dynamically loaded and linked in the same manner by UI 111. Also, a PD may be added or removed from the configuration without changing the underlying code.

Because of some interdependencies, Pds 20 must be loaded in a specific order, e.g. the Compression PD requires the framed packets of the framing PD. The WinStation includes the following optional Pds:

(a) a Compression PD for compressing and decompressing of raw data;
(b) a Reliable PD for error handling for unreliable transports such as IPX and Async;
(c) a Framing PD for framing of stream type data from Async and TCP transport services into packets;
(d) a Modem PD for managing the establishment of a modem connection; and
(e) an Encryption PD for encrypting data.

The Wds and Pds each provide a set of Application Program Interfaces (APIs)that includes:

(a) Load ( ) for loading and linking a driver into the protocol stack;
(b) WdUnload( )/PdUnload( ) for unlinking and unloading a driver from the protocol stack;
(c) WdOpen/PdOpen for opening and initializing a driver;
(d) WdClose/PdClose for closing a driver;
(e) WdInfo/PdInfo for querying driver information;
(f) WdPoll/PdPoll for getting status and giving control to drivers in the protocol stack;
(g) PdWrite for writing data;
(h) WdQueryInformation/PdQueryInformation for querying modem status, mouse information, last error, or statistics;
(i) WdSetInformation/PdSetInformation for connecting, disconnecting, setting and killing focus.

The Transport Drivers (TDs) are similar to the Pds, i.e. the top interfaces are the same and TD loading, linking, and polling are done in the same way. The Tds differ from the Pds because the bottom interface of each is for a specific transport service. For example, the DOS IPX TD is programmed for the Novell IPX DOS INT for reading and writing packets over the underlying IPX network.

The WinStation client includes the following TDs 20:

(a) an IPX (Internet Packet Exchange) TD is a NetWare LAN communication protocol for moving data between server and/or workstation programs running on different network nodes;

(b) an SPX (Sequenced Packet Exchange) TD is an enhanced set of commands implemented on top of IPX for creating a true transport layer interface;

(c) a TCP/IP (Transmission Control Protocol) TD is an Internet protocol suite providing reliable, full duplex, stream service.

(d) a NetBIOS (Network Basic Input/Output System) TD is an application programming interface for data exchange between a server and/or workstation programs running on different network nodes; and (e) an Async TD is the standard interface to an RS-232 type asynchronous transport service.

The TD APIs are similar to those listed for the Pds/Wds above.

Name Resolver (NR) 30 is a DLL module for providing network name-to-address translation of a selected application server to UI 111 of FIG. 7. NR 30 specific APIs include: Load( ), NrUnload( ), NrOpen( ), NrClose( ), NrInfo( ), NrPoll( ), NrNameToAddress( ), and NrErrorLookup( ).

Name Enumerator (NE) 31 of FIG. 7 is a DLL module for enumerating all available application servers on the network. NE 31 specific APIs include: Load( ), NeUnload( ), NeOpen( ), NeClose( ), NeInfo( ), NePoll( ), and NeEnumerate( ).

Virtual Channel Driver (VD) set 60 are directly connected to ICA WD to allow application level communication to be multiplexed with the display protocol. The set of Vds support the following functions:

(a) client printer mapping for allowing a printer device on the Application Server to be redirected to a printer on the client computer;

(b) client drive mapping for redirecting drive letters on the Application Server to drive letters that exist on the client computer; and (c) Thinwire presentation protocol for operating the WD protocol as a virtual channel.

VD set 60 includes the following APIs: Load( ), VdUnload, VdOpen, VdClose( ), VdInfo( ), VdPoll( ), VdQueryInformation, and VdSetInformation( ).

Scripting 32 (FIG. 7) is an optional DLL that is an extension of UI 111 for prerecording keystrokes and responses to display screen output for automating some user operations.

Because the application server and the client (user) workstation are generally physically separated and are only linked by a transport mechanism for communications that is of lower bandwidth than that required to directly support the workstation display if it were part of the application server's host system, it is highly desirable to have an efficient method to send graphical data and control messages from the application server to the workstation. This objective requires the use of bandwidth compression encoding techniques at the application server for more efficient use of the common transport system in supporting the illusion that the application is being executed locally.

The use of bandwidth compression techniques for the transmission of text data does not, per se, remove the need to recreate the original data (and bandwidth) required for driving the workstation display. The original bandwidth requirement obtains after the reduced bandwidth encoded message is expanded to the original form required to drive the work station display. For example, the graphical instructions could be encoded by using a code book in which each complex graphical instruction is represented by a simpler numeric code. Upon receipt of the coded graphical data, each numeric code would be decoded at the workstation by entering a copy of the code book using an address corresponding to the numeric code and retrieving the corresponding complex graphical instruction.

The ability to efficiently communicate graphical text data in the form of glyphs (or bit patterns that represent pixel on/off states) is essential for enabling the user to perceive a responsive and timely graphical text display at the workstation even though the application code is executing remotely in a processor that is separated by a low bandwidth transport system.

Prior art techniques for reducing the bandwidth required for the transmission of glyphs has achieved bandwidth reduction by transmitting a text string that includes an ASCII code character for each character of the text plus the font type, size, style, and color. This requires that the receiving workstation have a glyph memory for storing each glyph pattern for each text character for each font type (e.g. Helvetica), for each font size (e.g. 30 points) and for each style (e.g. Italic), required for the session. Typically, 500K bytes of storage is required to store a given font set of a single size and style.

SUMMARY OF THE INVENTION

The present invention is a lossless (reversible) bandwidth compression method for encoding graphical text data represented as a string of characters in an application server so that the compressed data requires significantly less bandwidth for transmission of the graphical text data to a user workstation. Furthermore, the amount of glyph storage that would be required if the encoding method had not been applied has been reduced. Each text character is represented by a bit mask of the area occupied by each character, each bit state of the mask represents the on/off state of the corresponding pixel in the character area. The glyph not only conveys font descriptive information but also provides auxiliary information such as foreground/background color and spacing (proportional/monospaced).

The method of the invention for lossless bandwidth compression encoding of graphical text data represented as a string of glyphs in an application server for transmission to a user workstation for decoding and reconstructing the original graphical text data includes the following steps:

a) at the application server, encoding each glyph in the string of glyphs by assigning to each unique glyph (i.e. the same character code, size, font, and style, but not necessarily the same color) a corresponding unique identification code (IDC);

b) transmitting a compressed string of data that is generated by sequentially transmitting each glyph in the string of glyphs together with each glyph's corresponding IDC if it has not been previously transmitted, otherwise only transmitting the corresponding IDC;

c) at the workstation, receiving the compressed string of data and storing each glyph in accordance with its assigned IDC; and d) regenerating the original string of glyphs by using the IDCs in the order received for retrieving the stored glyphs.

BRIEF DESCRIPTION OF THE DRAWINGS

The present invention may be more fully understood from the detailed description given below and from the accompanying drawings of the preferred embodiments of the invention, which, however, should not be taken to limit the invention to the specific embodiment but are only for explanation and understanding.

DETAILED DESCRIPTION OF THE INVENTION

In order to overcome the prior art limitations, the present invention uses a highly efficient bandwidth compression encoding technique for reducing the transport bandwidth required for supporting a user display of text data without introducing great cost and complexity at the application server or user workstation.

Figure 1:
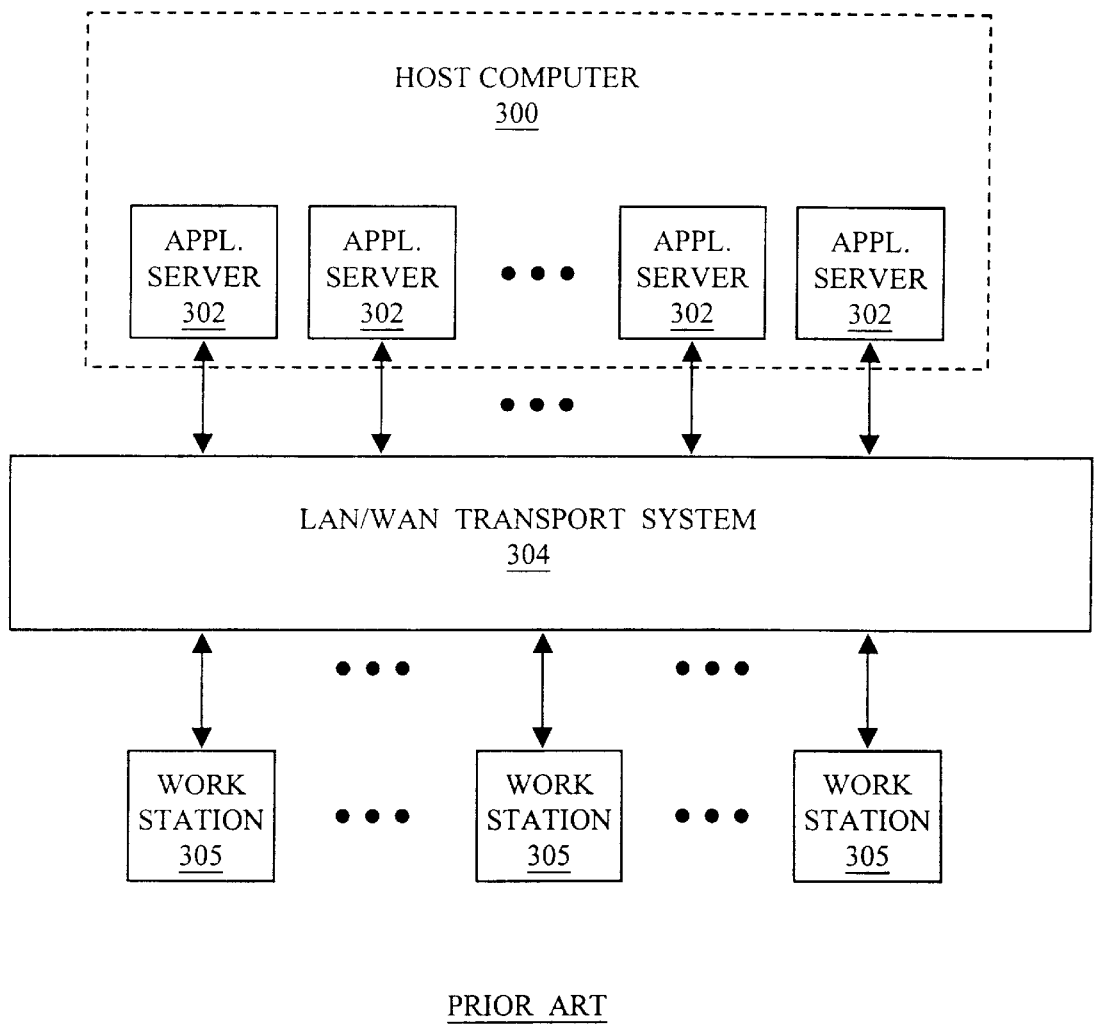
FIG. 1 shows a distributed application presentation system.
Figure 2:
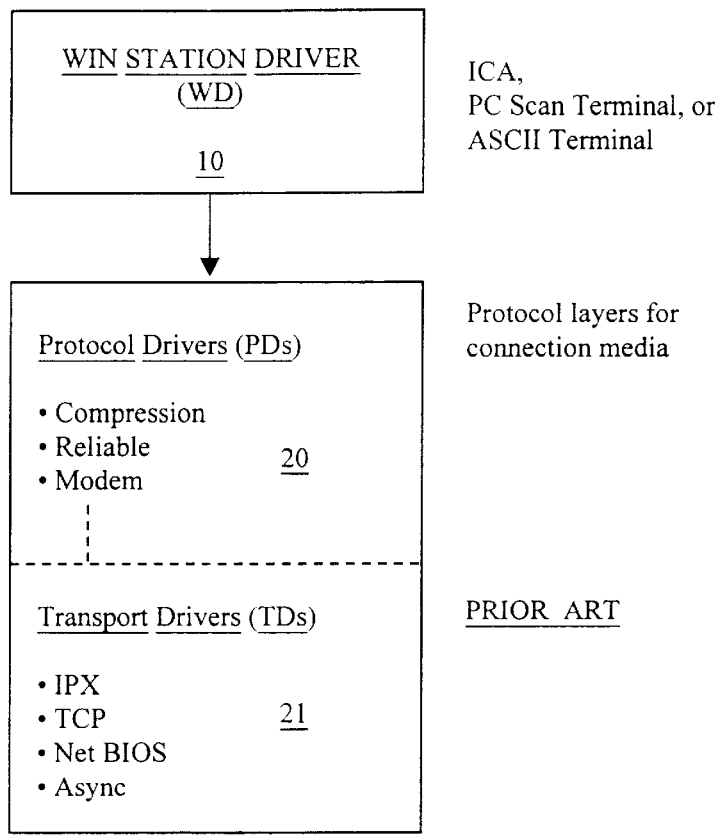
FIG. 2 shows the major workstation protocol layers of a distributed process application server system.
Figure 3:
FIG. 3 shows a communication packet format used in the distributed process system.
Figure 4:
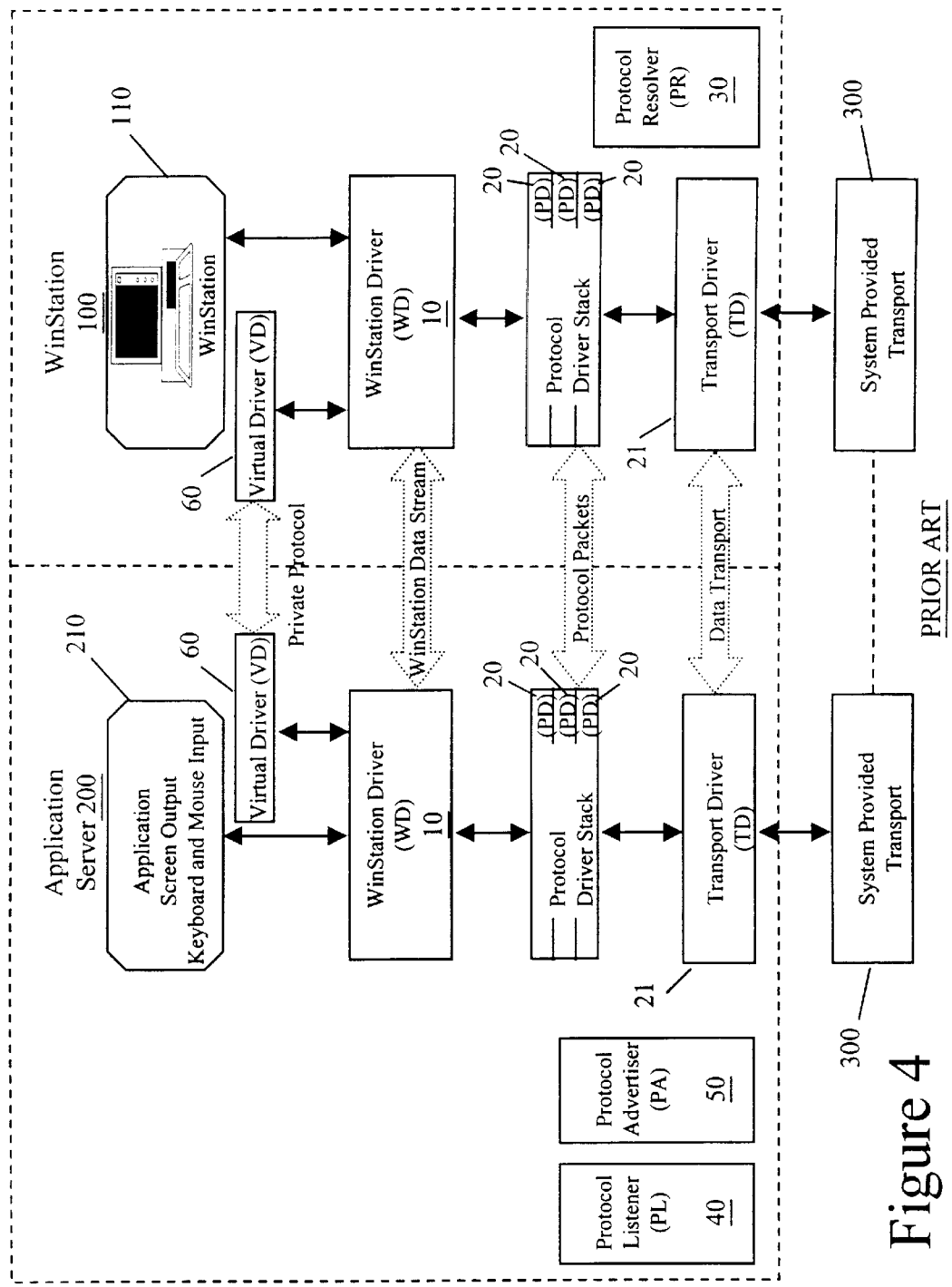
FIG. 4 shows the communication stack architecture of a commercial distributed process application server system.
Figure 5:
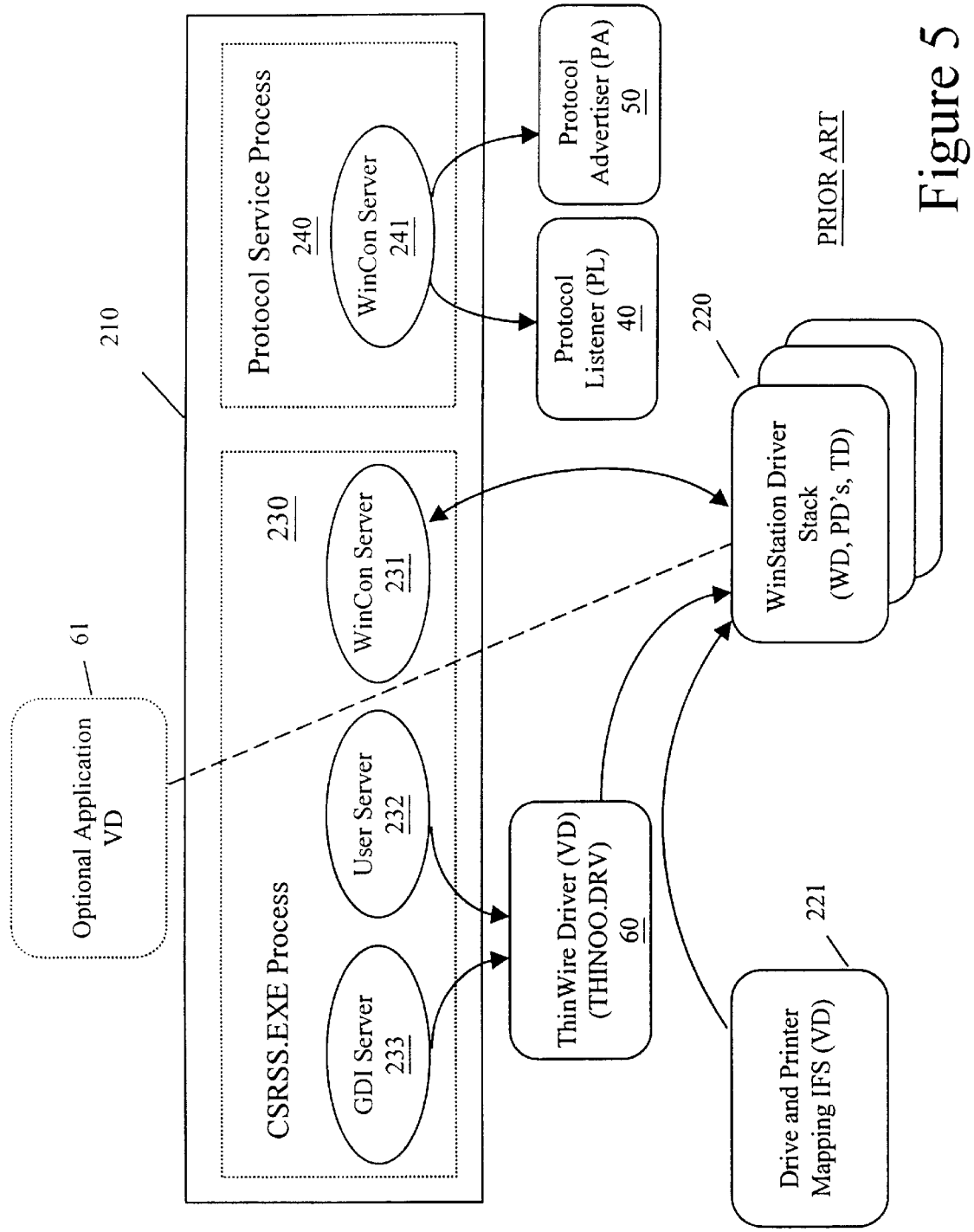
FIG. 5 shows the processes of the application server.
Figure 6:
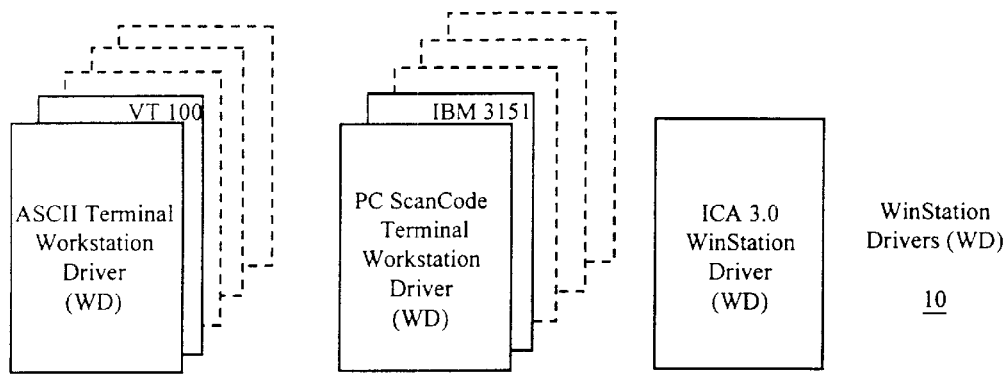
FIG. 6 shows the application server protocol stack architecture components.
Figure 6:
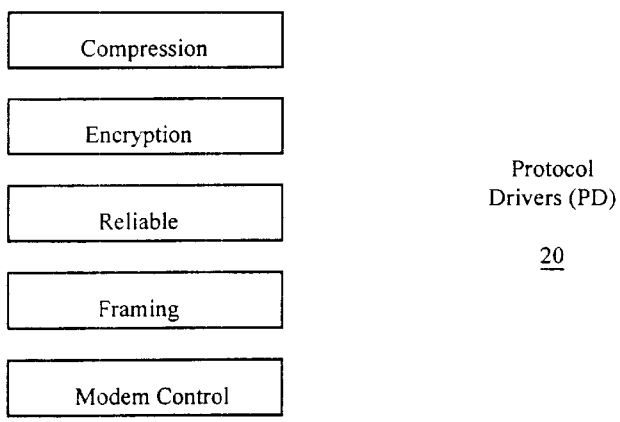
Figure 6:
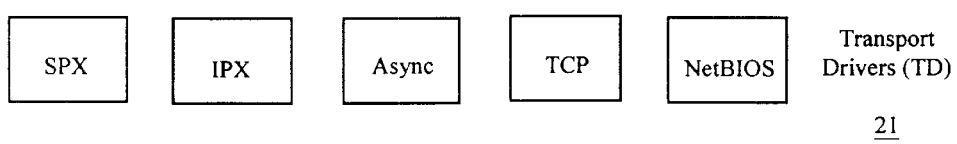
Figure 7:
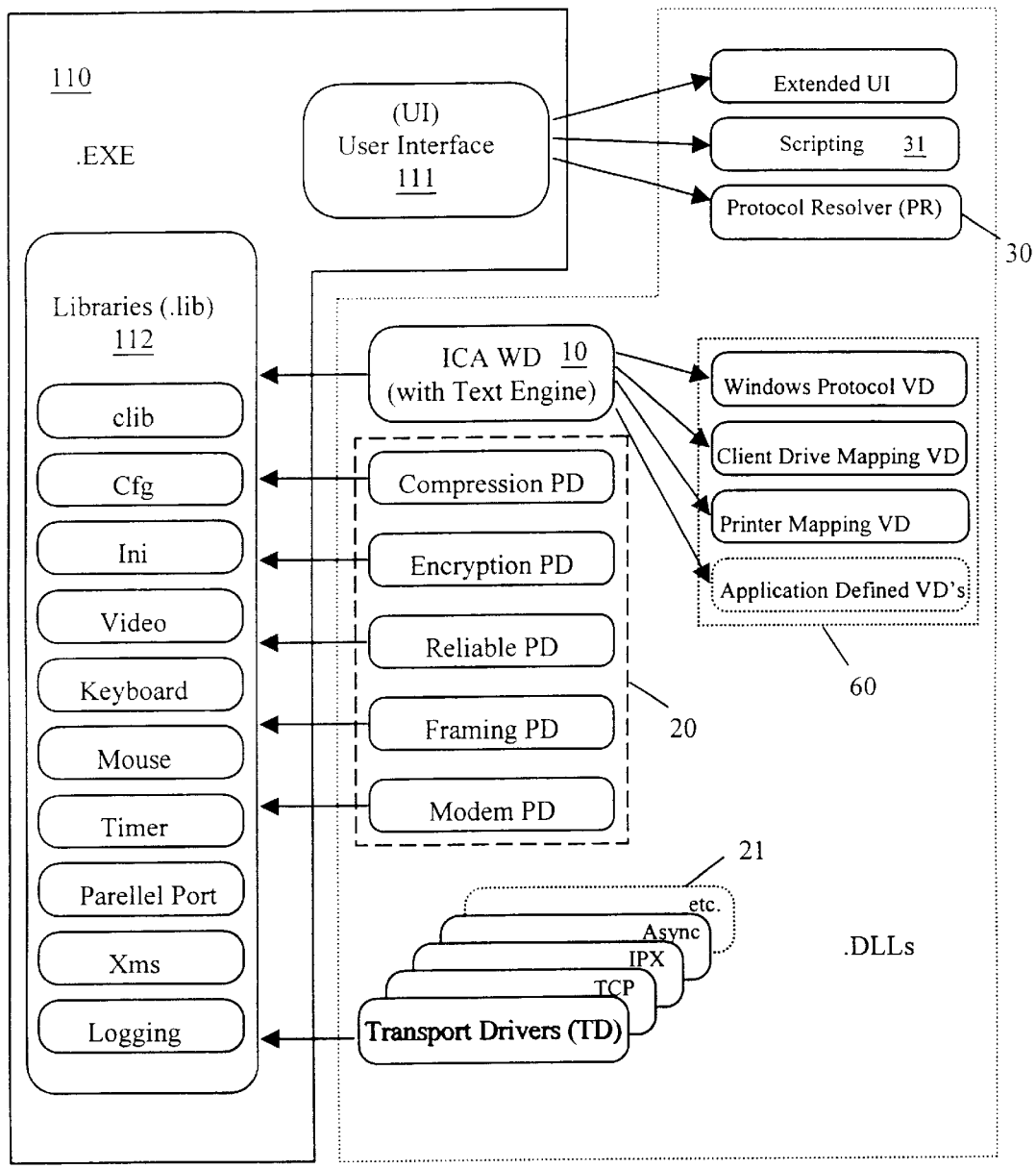
FIG. 7 is an architectural representation of an ICA type workstation.
Figure 8:
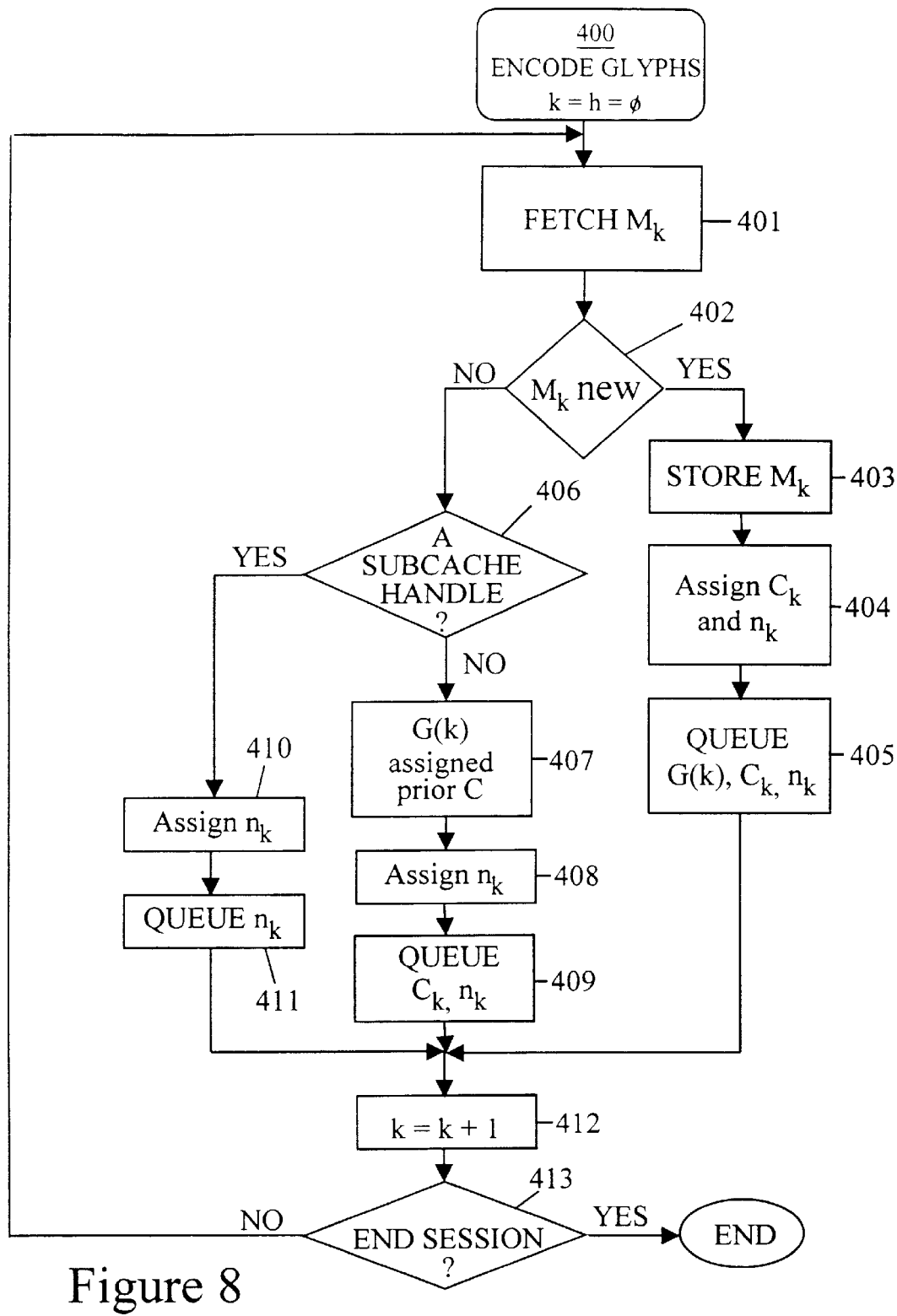
FIG. 8 is a flow diagram for bandwidth compression encoding of glyph data.

FIG. 8 is a flow diagram of method 400 for encoding glyphs at the application server. The method assumes that a set of glyphs (G(0), G(1), . . . , G(k), . . . , G(k-)) are to be transmitted from the application server to a user workstation for providing application text data for the display. Each glyph, G(k), is assigned a simple identification number (ID), $m_k$, that clearly distinguishes different glyph patterns by assigning unique $m_k$ identification numbers for different patterns, but has the same number for identical glyph patterns. In step 401, the ID, $m_k$, of the $k^{th}$ glyph, G(k), in the sequence of glyphs to be transmitted is fetched and in step 402 is checked against a stored list of previously fetched glyph IDs. If $m_k$ has not been previously stored (new), $m_k$ is stored in step 403. In step 404, glyph G(k) is assigned a cache handle, $c_k$, that is used for identifying the location in the user workstation glyph cache memory at which the glyph, G(k), is to be stored. Also, optional subcache handle, $n_k$, can be assigned in step 404 for reducing the amount of data that needs to be transmitted from the application server to the workstation.

In the preferred embodiment, cache handle $c_k$ is a 32-bit number while the subcache handle, $n_k$, is a 7-bit number that is used at the user workstation to address a subcache in which the last 128 most recently used (MRU) 32-bit cache handles are stored. If this option is exercised, each time step 402 determines that the glyph identified by $m_k$ is new, the least recently used (LRU) address in the subcache, $n_k$, is assigned in step 404 together with the cache handle, $c_k$. Both handles ($c_k$, $n_k$) and glyph G(k) are then queued in step 405 for transmission to the user workstation.

If $m_k$ has been previously stored, and hence not new, step 402 moves the method to step 406 where the application server determines if the glyph corresponding to $m_k$ has been assigned a subcache handle (i.e. that it is one of the last 128 MRU glyphs) indicating that a cache handle is currently stored in the cache and and the corresponding glyph is stored in cache. If not, glyph G(k) is assigned the previously assigned handle value, c, in step 407. Step 408 optionally assigns subcache handle $n_k$, the subcache address of the LRU address, which is place in the transmit queue together with $c_k$ in step 409.

If step 406 determines that the glyph G(k), associated with ID $m_k$ is one of the MRU (and hence its handle is stored in the subcache at address $n_k$), step 410 assigns subcache handle $n_k$ which is then queued for transmission in step 411.

Step 412 increments index k. Step 413 checks if the application session is over and, if so, ends the process. Otherwise, step 410 returns to step 401 for another iteration.

In this manner, only new glyph patterns are transmitted when first encountered together with the associated cache and subcache handles. Otherwise, a pair ($c_k$,$n_k$) is sent if $c_k$ is not a MRU cache handle, or only $n_k$ is sent if $c_k$ is a MRU cache handle stored in the subcache at address $n_k$. Because $n_k$ is a 7-bit (<1-byte) number and $c_k$ is a 32-bit (4-byte) number a large saving in data rate can be realized.

Figure 9:
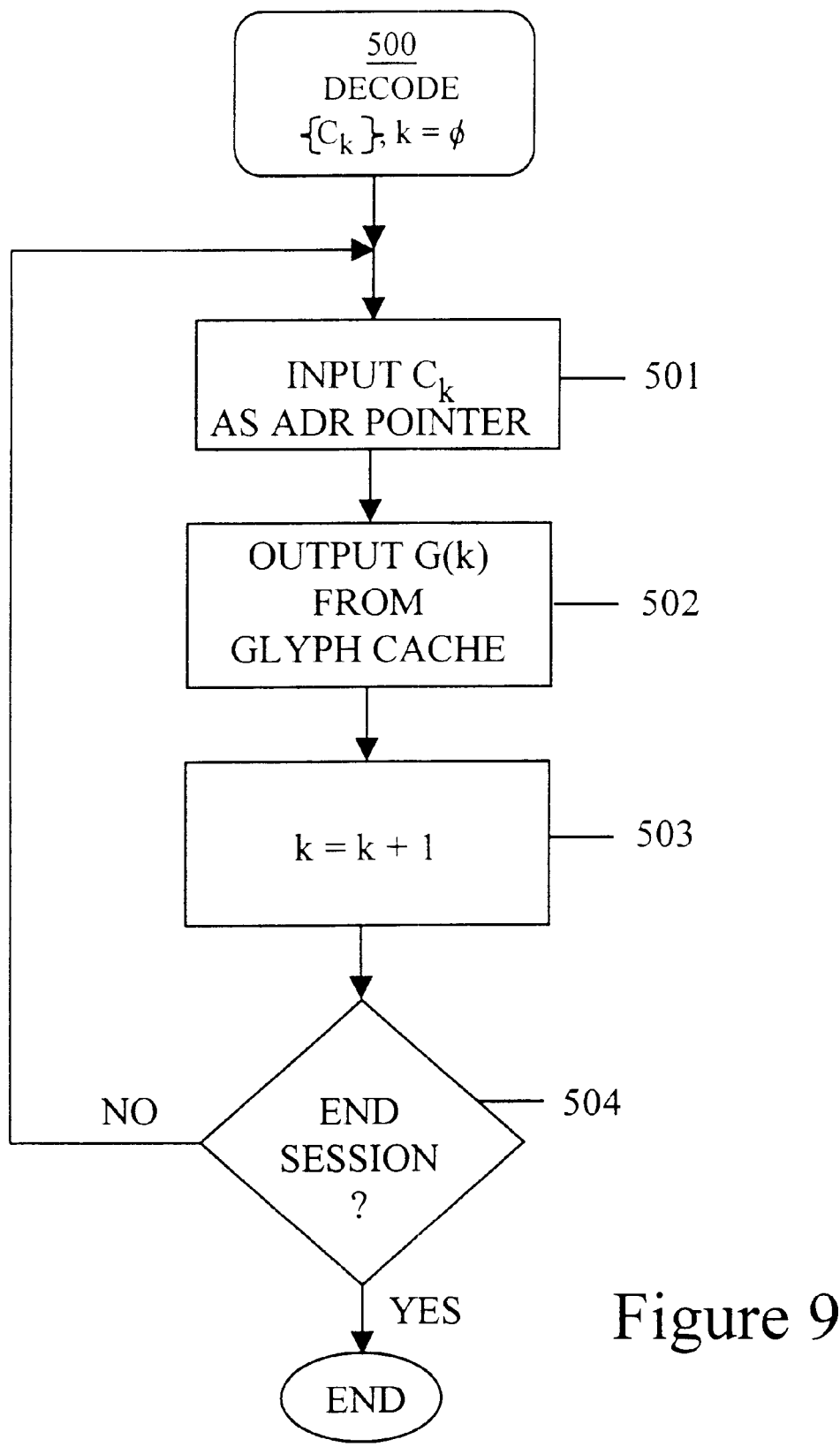
FIG. 9 is a flow diagram for decoding bandwidth compressed glyph data.

FIG. 9 is a flow diagram of the simple decode process 500 required in the workstation. The sequential set of cache handles (generally a mix of single cache or subcache handles, or pairs of cache and subcache handles) are accessed in order, in step 501. Step 502 determines if the input is a subcache handle $n_k$ and, if so, step 503 gets the corresponding $c_k$ from the subcache at address $n_k$. Otherwise, step 502 goes directly to step 504 where glyph G(k) is obtained from cache by use of handle $c_k$. Step 505 increments index k and step 506 determines if the session is over. If so, the process ends. Otherwise, the process returns to step 501.

If the workstation glyph cache memory is designed so that a different logical cache memory is used for each glyph size (chunk), the method of encoding (FIG. 8) and decoding (FIG. 9) should be modified.

In the modified method, each glyph is identified by two parameters: a handle and a chunk (size) parameter. The logical address of a given glyph in cache memory is equal to the product of the handle value and the chunk of the glyph. A typical set of glyph chunk values is 32, 128, 512, and 2048 bytes. (See the jointly filed patent application for "A Method for Efficiently Caching Graphical User Interface Objects in a Set of Non-Contiguous Cache Memory Areas", Krantz et al., Ser. No. 08/541,128, filed Oct. 11, 1995, incorporated herein as reference.)

Figure 10:
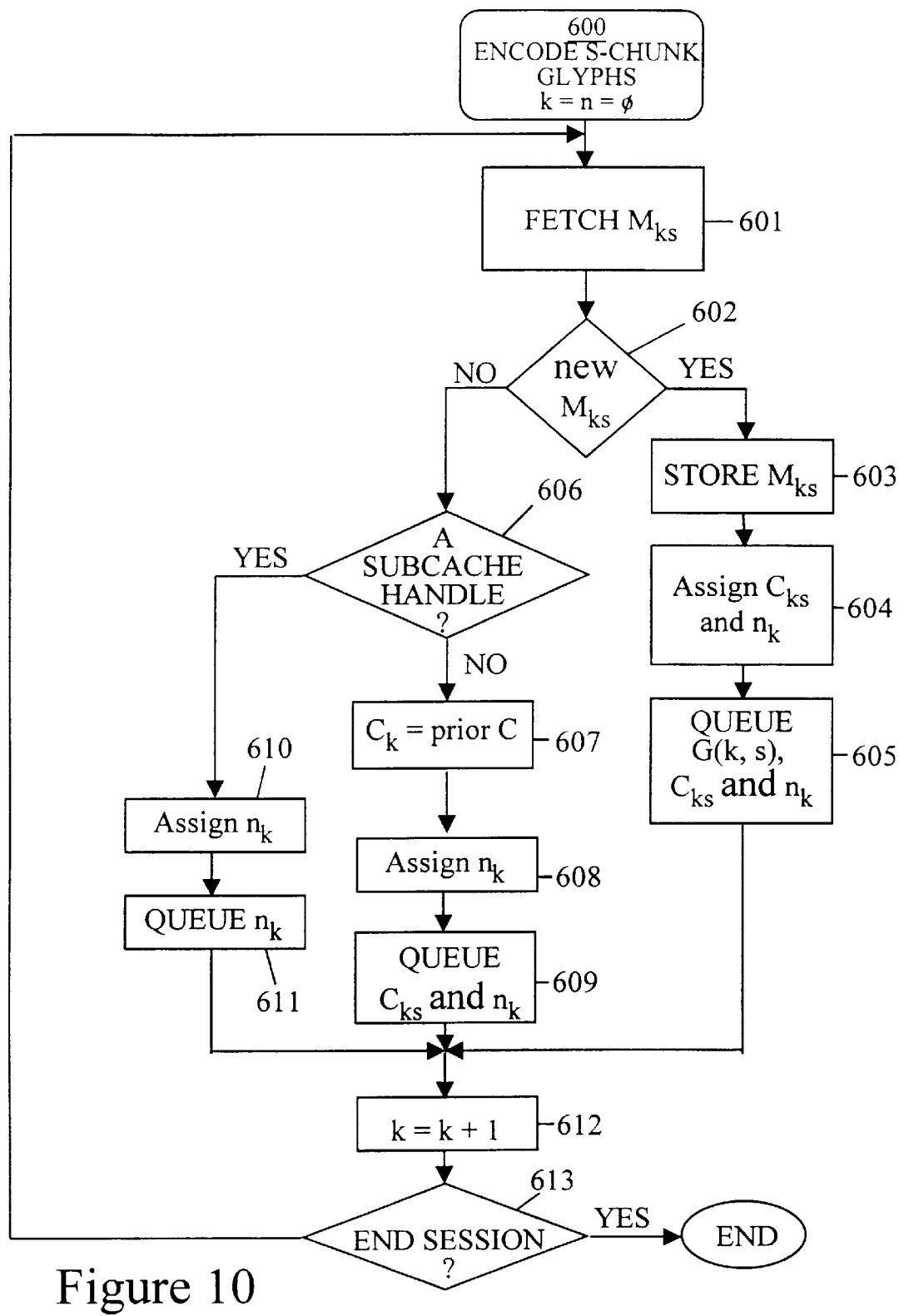
FIG. 10 is a flow diagram for bandwidth compression encoding of glyph data in systems which cache decoded glyph patterns in separate caches according to size.

FIG. 10 is a flow diagram of method 600 for encoding glyphs of multiple chunk types S for storage and retrieval from multiple logical cache memories. It should be noted that FIG. 10 is similar to FIG. 8 because process 600 of FIG. 10 differs only because it represents an encoding process for specific chunk sizes, S.

Step 601 fetches $m_{ks}$, the ID for G(k,S), the $k^{th}$ glyph of size S. Step 602 checks a list of previously fetched glyph IDs.

If $m_{ks}$ is new and has not been previously stored, the process moves to step 603 where the ID, $m_{ks}$, is stored for future reference. In step 604 a handle, $c_{ks}$, and optional subcache handle $n_k$, is assigned. Step 605 queues glyph G(k,S) and handles $C_{ks}$ and $n_k$ for transmission to the user workstation. If $m_{ks}$ has been previously stored, step 602 moves to step 606 where it is determined if the glyph's cache handle is one of 128 MRU handles stored in the subcache. If not, step 607 assigns the previous handle value and step 608 assigns a subcache handle, $n_k$, corresponding to the LRU address in the subcache at which handle $c_{ks}$ of current glyph, G(k,S), is to be set stored. Step 609 then queues $c_{ks}$ and $n_k$ for transmission to the workstation. If step 606 determines that the handle is stored in the subcache at address $n_k$, step 610 assigns the value $n_k$ for transmission queuing in step 611. Step 612 increments index k. Step 613 returns the process to step 601 unless the session is over.

The queued data consisting of glyph patterns, cache handles, and subcache handles are transmitted to and received by the workstation. The glyphs of each size S are stored in their respective caches at addresses determined by the cache handle as described in relation to FIG. 11. The subcache handles, as previously described relative to FIGS. 8, 9, and 10, are used for reducing the amount of data to be transmitted and for accessing the workstation subcache where cache handles for the MRU glyph patterns are stored.

Figure 11:
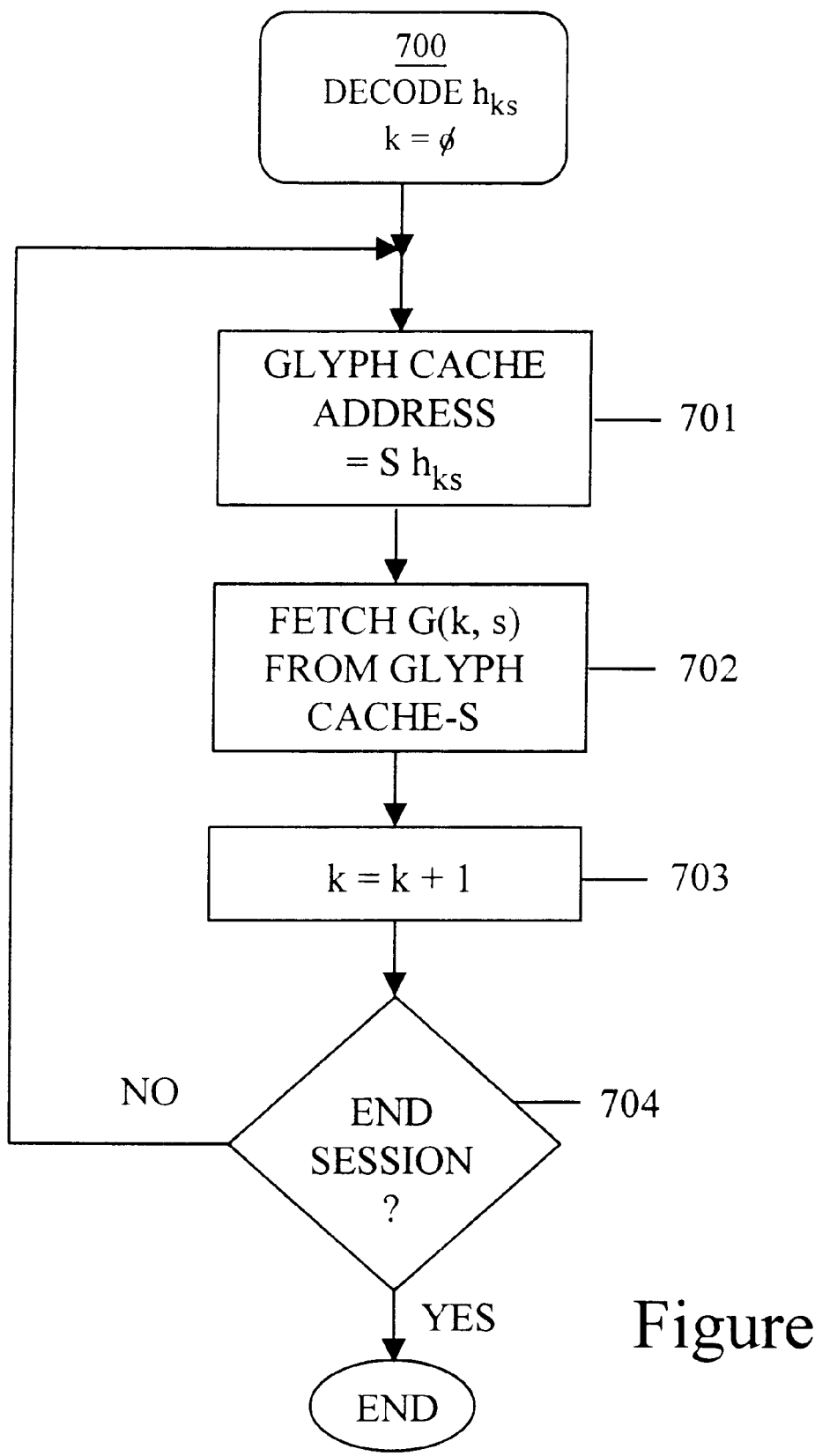
FIG. 11 is a flow diagram for decoding the encoded data from the method of FIG. 10.

FIG. 11 is a flow diagram of the multicache decode method 700. At step 701, a cache handle $c_{ks}$ or a subcache handle $n_k$ is taken from the workstation receiving queue. Step 702 determines if the input is a subcache handle, $n_k$, from the workstation subcache. Step 704 computes the cache address at which the glyph is stored by forming the product of the cache size, S, and the cache handle, $c_{ks}$, that was assigned by the application server. The product, $S*c_{ks}$, is the logical offset into the chunk type (size) S glyph cache. Step 705 reads the glyph pattern corresponding to G(k,S). Step 706 increments the index k and step 707 determines if the session has been terminated. If not, the process returns to step 701. Otherwise, the process ends.

Figure 12:
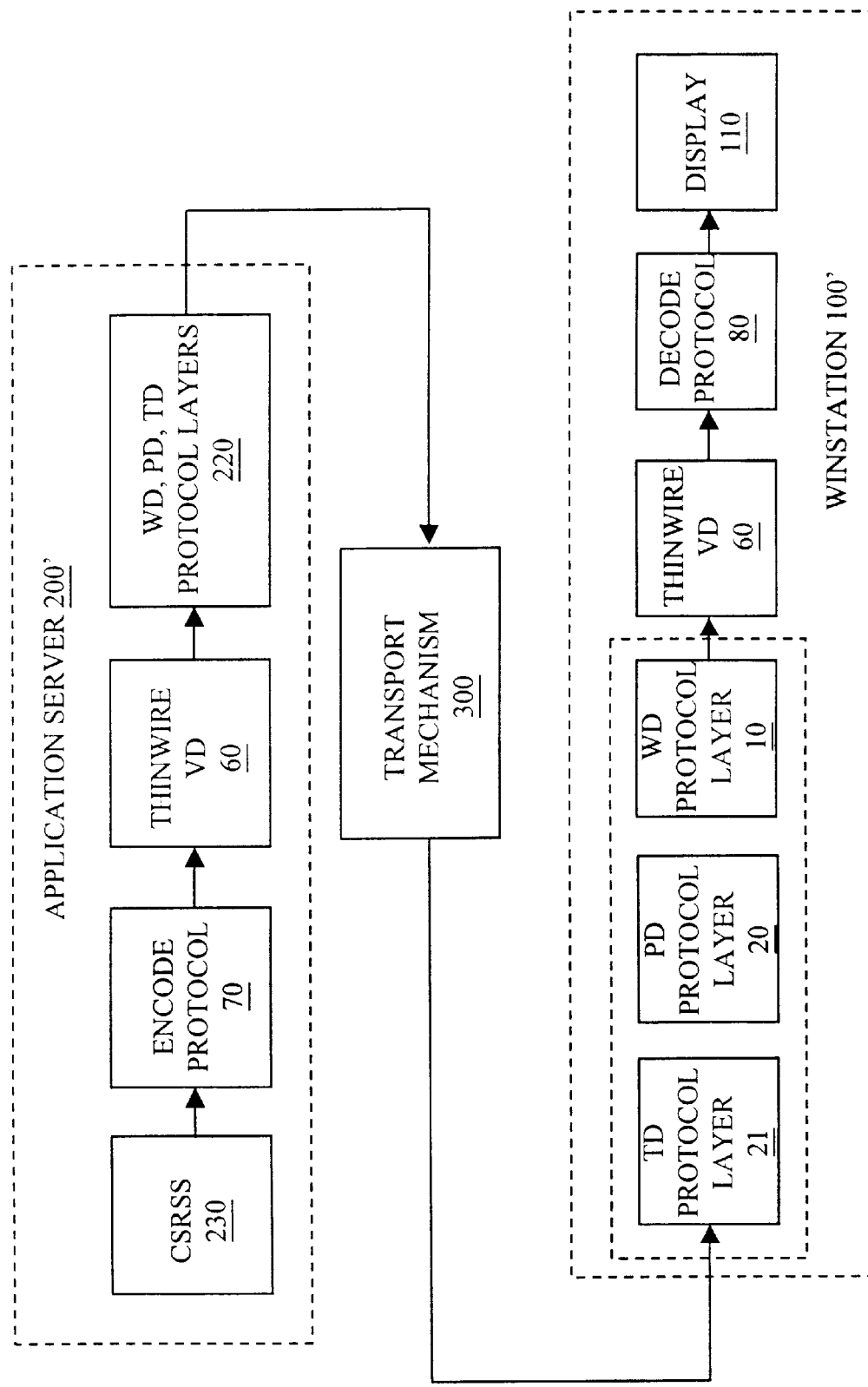
FIG. 12 is a system block diagram showing the relationship of the bandwidth compression encode and decode protocol layers to other protocol layers.
Figure 13A:
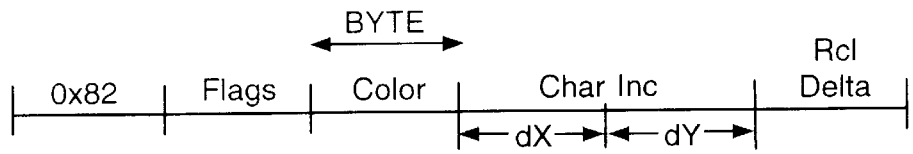
FIG. 13 shows the structure of the ThinWire virtual channel text command TWCMD_TEXT_NOCLIP.
Figure 13B:
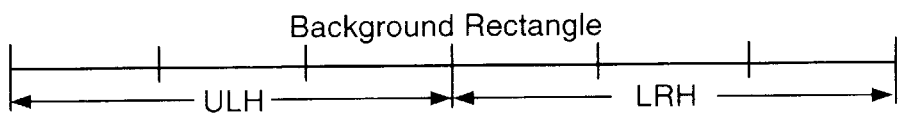
Figure 13C:
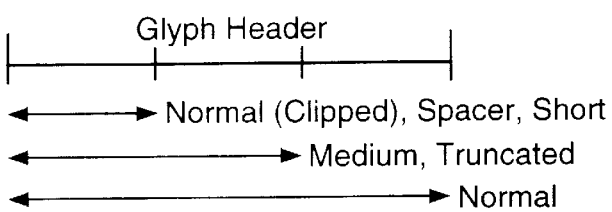
Figure 13D:
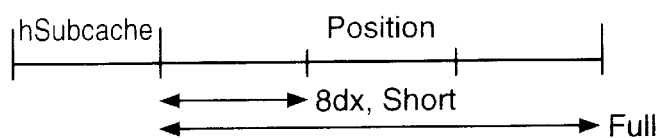
Figure 13E:
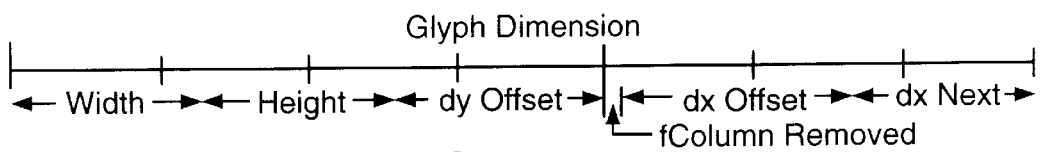
Figure 13F:
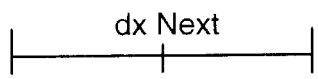
Figure 13G:
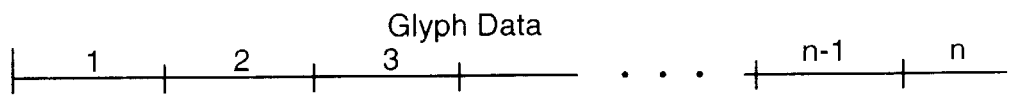

FIG. 12 is a system block diagram that shows how the bandwidth compression encoding and decoding protocol layers are introduced into the Citrix Systems Winstation 100 and the WinView™ Application Server 200. Modified Application Server 200' includes the Client Server Realtime Subsystem (CSRSS) 230 that supplies ThinWire virtual channel driver VD 60 with the raw graphical data that are to be encoded for transmission to the workstation. The encoded glyph data stream generated by the method of FIG. 10 is generated by the encode protocol 70 of ThinWire virtual channel driver VD 60 for incorporation into a virtual channel packet which is then incorporated into standard packet format by the WinStation Driver Stack 220 for transmission over the common transport mechanism 300. WinStation 100' receives the packets from transport mechanism 300 and processes the received packets through the WinStation WD Stack 220 (protocol layers TD 21, PD 20, and WD 10). The output of WD Stack 220 is the ThinWire packet stream that is delivered to Thinwire VD 60 for interpretation. The encoded bandwidth compressed glyph pattern sequence and code table index sequence is recovered and delivered to decode protocol 80 of VD 60 that decodes the glyph data in accordance with the method of FIG. 11 and presents fully decoded glyph patterns to display 110.

Four Thinwire commands are provided for the management of text data transmission between the application server and the user workstation. The basic command that is used for all text drawing operations except those involving clipping displays is TWCMD_TEXTOUT_NOCLIP which displays an entire string of glyphs. There are two text drawing Thinwire packet commands that involve clipping: TWCMD_TEXTOUT_RCLCLIP and TWCMD_TEXTOUT_CMPLXCLIP. The former command is used when simple clipping is required while the latter is used when complex clipping is needed. A fourth command, TWCMD_TEXTOUT_RCLEXTRA, may follow a text drawing operation for drawing an underline or strikeout on top of the text.

FIG. 13 is a graphical description of the structure of Thinwire packet command TWCMD_TEXTOUT_NOCLIP in which the command string is broken-up into line segments (a) through (g) for display convenience but is in reality a continuous string. Each line segment is further segmented into contiguous bytes that are labeled for identifying the associated function and are defined below.

0x82—Identifies packet as TWCMD_TEXTOUT_NOCLIP.

Flags—A set of flags:
fSameColor (bit 0) indicates if foreground and background color is the same as the previous text operation;
fOpaqueBackground (bit 1) indicates if background is opaque (colored);
fMonospaced (bit 2) indicates monospaced (not proportionately spaced) glyphs;
fDefPlacement/fSameCharInc (bit 3) indicates if glyphs have default placement or (when bit 2 indicates monospaced) indicates if last monospaced increment or new increment value will be submitted;
fCalcWidth (bit 4) indicates if glyph width can be used to position the next glyph;
fRclDelta (bit 5) indicates if a normal background rectangle or a 1-byte delta for computing the back-ground rectangle will be submitted; and
fFirstPosition (bits 6,7) indicating that the first glyph position will be determined as follows:
00—submitted as a 3-byte first glyph position,
01—be the same as the last text string,
10—have the same Y-coordinate, X-delta as last string,
11—have the same X-coordinate, Y-delta as last string.

Color—(sent only if Fsamecolor indicates a different color) bits 3-0 indicate foreground color and bits 7-4 background color.

CharInc—(2 bytes, sent only if Fmonospaced is true and Fsamecharinc is false) for positive increment to be added to a current glyph position to obtain position of the next glyph.

RclDelta—an 8-bit signed value to be added to the right coordinate of the current background rectangle to compute the next background rectangle.

Background Rectangle—(6 bytes) 3 bytes are used to specify the upper left hand (ULH) corner position, and 3 bytes to specify the lower right hand (LRH) corner of the rectangle.

Glyph Header—(1 to 3 bytes) can have one of five formats specified by the first 3 bits (b2-b0) as listed below. NormalFormat (1 or 3 bytes) wherein the bits are interpreted as follows:

fTotallyClipped (b3) indicates glyph is totally clipped and should not be cached or drawn (header is 1-byte);

fLastGlyph (b4) indicates last glyph in string;

fSubCache (b5) indicates subcache handle is included;

fGetFromCache (b6) retrieves this glyph from user's cache;

fPutInCache (b7) places this glyph in user's cache.

fWidthIncluded (b8) offset dxNext is in this data stream;

hCache (b20-b9) a cache handle used together with with the chunk type (size) to store and retrieve data from user's glyph cache;

ChunkType (b22-b21) is used to indicate one of four size categories including one or more 2K bytes, 512 bytes, 128 bytes, or 32 bytes; and Reserved (b23) not assigned.

TruncatedFormat (2 bytes) wherein the bits are interpreted as follows:

bits b8-b3 are as defined above; and hSubcache (b15-b9) is a value from 0 to 127 indicating the last most recently used cache handles (Hcache).

MediumFormat (2 bytes) wherein the bits are interpreted as follows:

b14-b3 are as defined under NormalFormat above; and f32B (b15) indicates 32B or 128B chunk type.

SpacesFormat (1 byte) wherein count (b7-b3) is a value from 1 to 31 that indicates the number of spaces to the next glyph.

ShortFormat (1 byte) wherein Hsubcache (b7-b3) is as defined in TruncatedFormat above.

Hsubcache—(1 byte, submitted only if Fsubcache is true and fShortFormat is false) is a value from 0 to 127 that represents the last most recently used cache handles.

Position—(1 or 3 bytes) submitted if fCalcPosition is false or, for the first glyph, if fFirstPos bits b7,b6 are in states 0,0 indicating a 3-byte Position value, or if Ffirstpos bits b7,b6 are in states 1,0 indicating use of the same Y coordinate and 8-bit delta from last string. The three formats are as follows:

8dx (1 byte) a signed 8-bit delta value used when Ffirstpos equals 10;

Short (1 byte) with b0 true, and b7-b1 indicate a signed 7-bit X-coordinate delta from −64 to +63 which is used to calculate the current glyph position based on the last glyph position and width; and Full (3 bytes) b0 false, b12-b1 represents a 12-bit signed X-coordinate, and b23-b13 an 11-bit Y-coordinate.

GlyphDimension—(6 or 7 bytes, submitted if Fgetfromcache is false) is interpreted as follows:

cx (b10-b0) glyph width;

cy (b20-b11) signed 11-bit Y-coordinate;

dyoffset (b31-b21) signed 11-bit offset used to get Y-coordinate of the top scan line of the glyph;

fColumnRemoved—(b32) indicates that dxnext must be incremented before it is used;

dxOffset (b44-b33) a 12-bit signed value to be added to the glyph position to get the X-coordinate of the left edge of the glyph; and dxnext (b55-b45, submitted if Fwidthincluded is true) is an unsigned 11-bit value that is used to calculate the next glyph position, and if fWidthIncluded is false, 6 bytes are used and bits b48-b45 are unassigned.

dxnext—(2 bytes) an unsigned 16-bit value to be added to the last glyph X-coordinate to obtain the current glyph position.

GlyphData—(n bytes, n=(((cx−1)/8+1)*cy) bitmap glyph data in the form of a cx by cy bit mask where bits set to 1 represent pixels set to the ForeGroundColor and bits set to 0 represent the other state (BackgroundColor if fOpaqueBackground is true).

Examination of the Glyph Header in FIG. 13, as described above, shows that the standard Thinwire packet format for command TWCMD_TEXTOUT_NOCLIP can be used to convey the necessary glyph pattern information in encoded form between the application server and the user workstation. Bit b6 indicates whether the current glyph pattern is to be retrieved from the user's cache and would be true if the pattern resides in cache memory. Bit b7 is used to indicate that the current pattern has not been previously cached and therefore should be. Bits b20-b9 are used to specify the current glyph handle (Hcache). The chunk type (size) is indicated by the bit pair (b22,b21) and can be used to select the appropriate cache in which glyph patterns having a common chunk type are stored. The Thinwire packet also provides the benefit of including additional text related information including color options and position information.

Thinwire command TWCMD_TEXTOUT_RCLCLIP is used for all text drawing operations which require a simple rectangular (one border) clipping. The command packet is as defined below:

0×84—identifies the packet as TWCMD_TEXTOUT_RCLCLIP; and the rest of the packet data stream is identical to that specified as part of the command packet TWCMD_TEXTOUT_NO-CLIP beginning at Flags.

The Background Rectangle is used as the clipping rectangle.

If flag Fopaquebackground is true indicating an opaque background, then it also indicates the background color of the clipping rectangle.

TWCMD_TEXTOUT_CMPLXCLIP, a Thinwire command packet that is used for text drawing operations that require more than a single clipping rectangle, is defined as follows.

0×85—identifies the packet as TWCMD_TEXTOUT_CMPLXCLIP: and, with the exception of the clipping rectangles which are submitted immediately prior to Glyph Header, the rest of the data stream is identical to that specified as part of TWCMD_TEXTOUT_NOCLIP starting with Flags.

Because these additional Thinwire commands contain the same information, i.e. Fgetfromcache, Fputincache, hChunk, and ChunkType, they are also suitable for use with the bandwidth compression methods described previously.

The methods and apparatus described provide an adaptive encoding technique that does not require the storage of a complete codebook at the client workstation that includes all possible glyphs, but only requires the storage of glyph patterns as they are needed. In this manner, a substantial reduction in glyph cache memory capacity is realized without any significant reduction in performance over the prior art methods.

As will be understood by those skilled in the art, many changes in the apparatus and methods described above may be made by the skilled practitioner without departing from the spirit and scope of the invention, which should be limited only as set forth in the claims that follow.

What is claimed is:

1. A method for lossless bandwidth compression encoding of data for transmission of encoded data from an application server to a client workstation for decoding in a distributed process system, the data represented as a glyph pattern string comprising of plurality of glyphs, the method comprising:

(a) assigning a unique handle to a glyph in the glyph pattern string for identification;

(b) assigning a unique subcache handle to the glyph in the glyph pattern string; and (c) generating a compressed glyph string for transmission to the client workstation by placing into the compressed glyph string:

(i) a first glyph identifier comprising the glyph, a chunk parameter, tile assigned handle, and the assigned subcache handle upon a first occurrence of the glyph in the glyph pattern string, the chunk parameter indicating the number of bytes required to store the glyph;

(ii) a second glyph identifier comprising the handle assigned to the glyph, a chunk parameter, and the subcache handle assigned to the glyph when the glyph has previously occurred in the glyph pattern string and the assigned handle is not one of a predetermined number of handles stored in a cache memory, the chunk parameter indicating the number of bytes required to store the glyph; and (iii) a third glyph identifier comprising the subcache handle assigned to the glyph, and a chunk parameter, when the glyph has previously occurred in the glyph pattern string and the assigned handle is one of a predetermined number of handles stored in a cache memory, the chunk parameter indicating the number of bytes required to store the glyph.

2. The method of claim 1 further comprising the step of:

(d) repeating steps (a) through (c) for each glyph in the glyph pattern string.

3. The method of claim 1 wherein step (b) comprises assigning a unique subcache handle to each unique glyph in the glyph pattern string, each subcache handle comprising less bits than the handle assigned to the glyph.

4. The method of claim 1 wherein step (a) comprises assigning a unique handle of thirty-two bits to each unique glyph in the glyph pattern string for identification.

5. The method of claim 1 wherein step (b) comprises assigning a unique subcache handle of seven bits to each unique glyph in the glyph pattern string.

6. A method for lossless bandwidth compression encoding of data for transmission of encoded data from an application server to a client workstation for decoding in a distributed process system, the data represented as a glyph pattern string comprising of plurality of glyphs, the method comprising:

(a) at the application server (i) assigning a unique handle to a glyph in the glyph pattern string for identification;

(ii) assigning a unique subcache handle to the glyph in the glyph pattern string; and (iii) generating and transmitting to the client workstation a compressed glyph string by placing into the compressed glyph string:

(A) a first glyph identifier comprising the glyph, a chunk parameter, the assigned handle, and the assigned subcache handle upon a first occurrence of the glyph in the glyph pattern string, the chunk parameter indicating the number of bytes required to store the glyph;

(B) a second glyph identifier comprising the handle assigned to the glyph, a chunk parameter, and the subcache handle assigned to the glyph when the glyph has previously occurred in the glyph pattern string and the assigned handle is not one of a predetermined number of handles placed in the compressed glyph string, the chunk parameter indicating the number of bytes required to store the glyph; and (C) a third glyph identifier comprising the subcache handle assigned to the glyph, and a chunk parameter, when the glyph has previously occurred in the glyph pattern string and the assigned handle is one of a predetermined number of handles placed in the compressed glyph string, the chunk parameter indicating the number of bytes required to store the glyph; and (b) at the client workstation (i) receiving the compressed glyph pattern string and storing each glyph in the compressed glyph pattern string at a memory element determined from the handle assigned to that glyph, (ii) storing each assigned handle in the compressed glyph pattern string in a memory element determined by the subcache handle corresponding to that assigned handle, and (iii) generating a decoded string of glyphs by sequentially using each subcache handle to retrieve assigned handles, and using each assigned handle in the compressed glyph string for retrieving a corresponding stored glyph and substituting a retrieved glyph for each second and third glyph identifier in the received compressed glyph string.

7. The method of claim 6 wherein step (a) further comprises the step of (a)(iv) repeating steps (a)(i) through (a)(iii) for each glyph in the glyph pattern string.

8. The method of claim 6 wherein step (b) further comprises the step of (b)(iv) repeating steps (b)(i) through (b)(iii) for each glyph in the received compressed glyph string.

9. The method of claim 6 wherein step (b) comprises:

(b) at the client workstation (i) receiving the compressed glyph pattern string and, for each first glyph identifier, storing the glyph in a cache memory element indicated by the chunk parameter at an address determined from the assigned handle, (ii) storing the assigned handle in a memory element determined by the subcache handle, and (iii) generating a decoded string of glyphs by sequentially using each subcache handle to retrieve assigned handles, and using each handle and chunk parameter in the compressed glyph string for retrieving a corresponding stored glyph and substituting a retrieved glyph for each second and third glyph identifier in the received compressed glyph string.

10. The method of claim 8 wherein step (b)(i) further comprises receiving the compressed glyph pattern string and, for each first glyph identifier, storing the glyph in a cache memory element indicated by the glyph data size indicator at a memory element identified by multiplying the given prescribed size and the assigned handle.

11. A system for the lossless bandwidth compression encoding and decoding of data, the encoded data for transmission from an application server to a client workstation over a common transport mechanism in a distributed process system, the data represented as a glyph pattern string comprising a plurality of glyphs, the system comprising:

(a) an application server assigning a unique handle and a subcache handle to a glyph, and generating and transmitting to the client workstation a compressed glyph pattern string by placing into the compressed glyph pattern string:

a first glyph identifier upon a first occurrence of the glyph in the glyph pattern string, the first glyph identifier comprising:

(i) the glyph,
(ii) the assigned handle,
(iii) an assigned subcache handle, and
(iv) a chunk parameter indicating the number of bytes required to store the glyph;

a second glyph identifier when the glyph has previously occurred in the glyph pattern string and the assigned handle is not one of a predetermined number of handles stored in a cache memory, the second glyph identifier comprising:
(i) the assigned handle,
(ii) the assigned subcache handle, and
(iii) a chunk parameter indicating the number of bytes required to store the glyph;

a third glyph identifier when the glyph has previously occurred in the glyph pattern string and the assigned handle is one of a predetermined number of handles stored in a cache memory, the third glyph identifier comprising:
(i) the assigned subcache handle, and
(ii) a chunk parameter indicating the number of bytes required to store the glyph;

(b) a client workstation receiving the compressed glyph pattern string and, for each received first glyph identifier, storing the glyph in a memory element indicated by the chunk parameter at an address determined from the assigned handle, the client workstation generating a decoded string of glyphs by sequentially using each subcache handle to retrieve an assigned handle and using each retrieved assigned handle to retrieve a glyph from the memory element, and substituting a retrieved glyph for each second and third glyph identifier in the compressed glyph pattern string.

12. The system of claim 11 wherein the compressed glyph pattern string is prepared by the application server for transmission to the client workstation by incorporating the compressed glyph pattern string into a virtual channel supported by a normal communication protocol of the distributed process system.

13. The system of claim 11 wherein the client workstation further comprises a set of logical glyph memories, the client workstation storing in each logical glyph memory glyphs of a single size category.

14. The system of claim 11 wherein the address for a glyph stored in a logical glyph memory designated for storing glyph patterns of a given prescribed size is the product of the given prescribed size and the assigned handle.

* * * * *

UNITED STATES PATENT AND TRADEMARK OFFICE
CERTIFICATE OF CORRECTION

PATENT NO. : 6,081,623
DATED : June 27, 2000
INVENTOR(S) : Bloomfield et al.

It is certified that error appears in the above-identified patent and that said Letters Patent is hereby corrected as shown below:

Column 9,
Line 53, "(G(k)" should read --G(k)--, and "G(k-)" should read --G(k-1)--.

Column 15,
Line 7, tile" should read --the--.

Figure 9 should appear as:

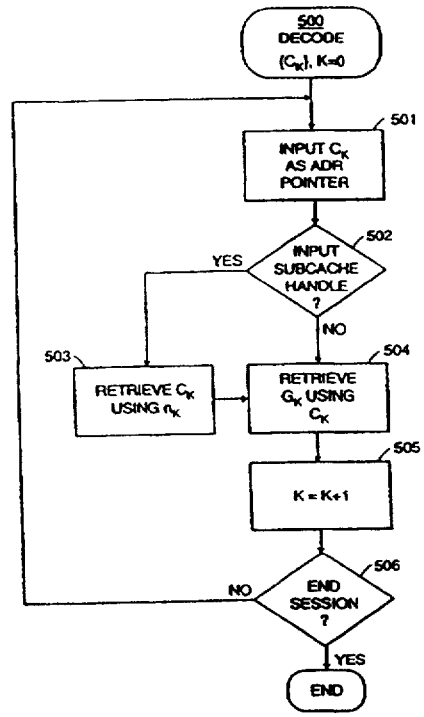

FIG. 9

UNITED STATES PATENT AND TRADEMARK OFFICE
CERTIFICATE OF CORRECTION

PATENT NO. : 6,081,623
DATED : June 27, 2000
INVENTOR(S) : Bloomfield et al

It is certified that error appears in the above-identified patent and that said Letters Patent is hereby corrected as shown below:

The text of box 607 of Figure 10 reading "$C_k$ = prior C" should read --G(k) assigned prior C--.

Figure 11 should appear as:

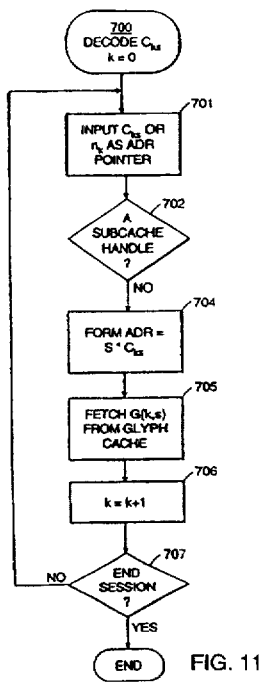

FIG. 11

Signed and Sealed this

Fourteenth Day of August, 2001

*Attest:*

*Attesting Officer*

NICHOLAS P. GODICI
*Acting Director of the United States Patent and Trademark Office*